(12) United States Patent
White et al.

(10) Patent No.: US 9,969,488 B2
(45) Date of Patent: May 15, 2018

(54) AUTOMATIC PROPELLER TORQUE PROTECTION SYSTEM

(71) Applicant: Sikorsky Aircraft Corporation, Stratford, CT (US)

(72) Inventors: Matthew A. White, Milford, CT (US); Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 302 days.

(21) Appl. No.: 14/703,373

(22) Filed: May 4, 2015

(65) Prior Publication Data
US 2016/0083076 A1 Mar. 24, 2016

Related U.S. Application Data

(60) Provisional application No. 61/987,225, filed on May 1, 2014.

(51) Int. Cl.
*B64C 11/34* (2006.01)
*B64C 11/40* (2006.01)
*B64C 27/82* (2006.01)
*B64C 11/30* (2006.01)
*B64C 27/00* (2006.01)

(52) U.S. Cl.
CPC .......... *B64C 27/006* (2013.01); *B64C 11/305* (2013.01); *B64C 11/34* (2013.01); *B64C 11/40* (2013.01); *B64C 27/82* (2013.01); *B64C 2027/8236* (2013.01)

(58) Field of Classification Search
CPC ....... B64C 11/305; B64C 11/34; B64C 11/40; B64C 11/325; B64C 11/385; B64C 2027/8236
See application file for complete search history.

(56) References Cited

U.S. PATENT DOCUMENTS

| 1,993,701 | A | * | 3/1935 | Avery | B64C 27/26 244/8 |
| 2,595,345 | A | * | 5/1952 | Engelhardt | B64C 11/305 416/33 |
| 2,605,849 | A | * | 8/1952 | Bordelon | B64C 11/325 200/16 A |
| 2,941,605 | A | * | 6/1960 | Sikorsky | B64C 27/54 244/17.13 |
| 2,951,543 | A | * | 9/1960 | Peterson | B64C 11/325 384/425 |
| 2,971,584 | A | | 2/1961 | Schon | |
| 3,002,568 | A | | 10/1961 | Bodem et al. | |
| 3,017,932 | A | * | 1/1962 | Chilman | B64C 11/325 416/33 |
| 4,571,157 | A | | 2/1986 | Eickmann | |
| 5,284,418 | A | | 2/1994 | Moriya | |
| 6,340,290 | B1 | | 1/2002 | Schott et al. | |

(Continued)

FOREIGN PATENT DOCUMENTS

EP 2343238 7/2011

*Primary Examiner* — Richard R Green
(74) *Attorney, Agent, or Firm* — Cantor Colburn LLP

(57) ABSTRACT

An aircraft is provided and includes one or more main rotors, one or more and propellers including blades that are rotatable about a rotational axis, a pitch of each of the blades being controllable, and a flight control computer disposed to control the pitch of each of the blades to reduce propeller blade pitch angles in an event of an engine failure.

12 Claims, 4 Drawing Sheets

(56) References Cited

U.S. PATENT DOCUMENTS

| | | | |
|---|---|---|---|
| 6,811,376 B2* | 11/2004 | Arel | B64C 11/38 |
| | | | 416/155 |
| 7,473,076 B2 | 1/2009 | Rosenkranz et al. | |
| 7,967,239 B2* | 6/2011 | Cotton | B64C 27/22 |
| | | | 244/60 |
| 9,193,450 B2* | 11/2015 | Worsham, II | B64C 27/006 |
| 2011/0164998 A1 | 7/2011 | Swift et al. | |

* cited by examiner

AUTOMATIC PROPELLER TORQUE PROTECTION SYSTEM

BACKGROUND OF THE INVENTION

The subject matter disclosed herein relates to an aircraft and, more particularly, to a helicopter with a rotor, an auxiliary propeller and an automatic propeller torque protection system for engine failure rotor droop avoidance.

Some helicopters, such as a coaxial helicopter, may include one or more rotors to provide lift and one or more propellers to provide thrust. The main rotor(s) include a hub(s) and blades extending outwardly from the hub(s). The blades rotate about the center of the hub to provide lifting forces and control forces and moments to control the vehicle. The pitch (feathering angle) of each of the main rotor blades is controlled in order to manipulate the induced forces and moments. The propeller(s) also include a hub and blades that rotate to induce thrust to provide additional forces and moments to control the aircraft, which can be manipulated as control inputs.

The aircraft further includes one or more engines and one or more transmissions. The engine provides power to drive rotation of the main rotor(s) and the propeller(s). The transmission(s) transmit power from the engine(s) to the main rotor(s) and propeller(s).

While such a helicopter is flying at high speeds, a significant percentage of the aircraft engine power is required to drive the propeller in order to provide thrust. In the event of an engine failure, power can no longer be provided from the engine(s) to the main rotor(s) or the propeller(s). The objective of the aircraft pilot during this engine failure condition is to rapidly decrease the pitch of the propeller blades in order to remove the propeller torque demand and to use the vehicle potential and kinetic energy to keep the main rotor(s) spinning. The main rotor rotational energy conservation is critical to control the aircraft in a descent to a landing spot, arrest the descent rate once close to the ground, and land safely before the rotor stops turning and can no longer provide lift and control. The pilot response delay and fidelity in the event of engine failure tends to be insufficient to remove the propeller torque demand prior to main rotor rotational speed reduction. Further, the workload to decrease the propeller pitch precisely is high, and the pilot must watch the display to set the proper propeller pitch command, thus reducing their "eyes out the window" situational awareness and their attention to other control inputs.

BRIEF DESCRIPTION OF THE INVENTION

According to one aspect of the invention, an aircraft is provided and includes one or more main rotors, one or more and propellers including blades that are rotatable about a rotational axis, a pitch of each of the blades being controllable, and a flight control computer disposed to control the pitch of each of the blades to reduce propeller blade pitch angles in an event of an engine failure.

According to another aspect of the invention, an aircraft is provided and includes a main rotor apparatus, a propeller apparatus including blades that are rotatable about a rotational axis, an engine to drive operations of the main rotor and propeller apparatuses and a flight control computer disposed to reduce a pitch angle of the blades in an event of an engine failure.

According to yet another aspect of the invention, a method of operating an aircraft is provided and includes automatically reducing a pitch angle of blades of a propeller, determining a pre-defined safe level for the pitch angle based on flight conditions and continuing the reduction of the pitch angle until the pitch angle reaches the pre-defined safe level.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
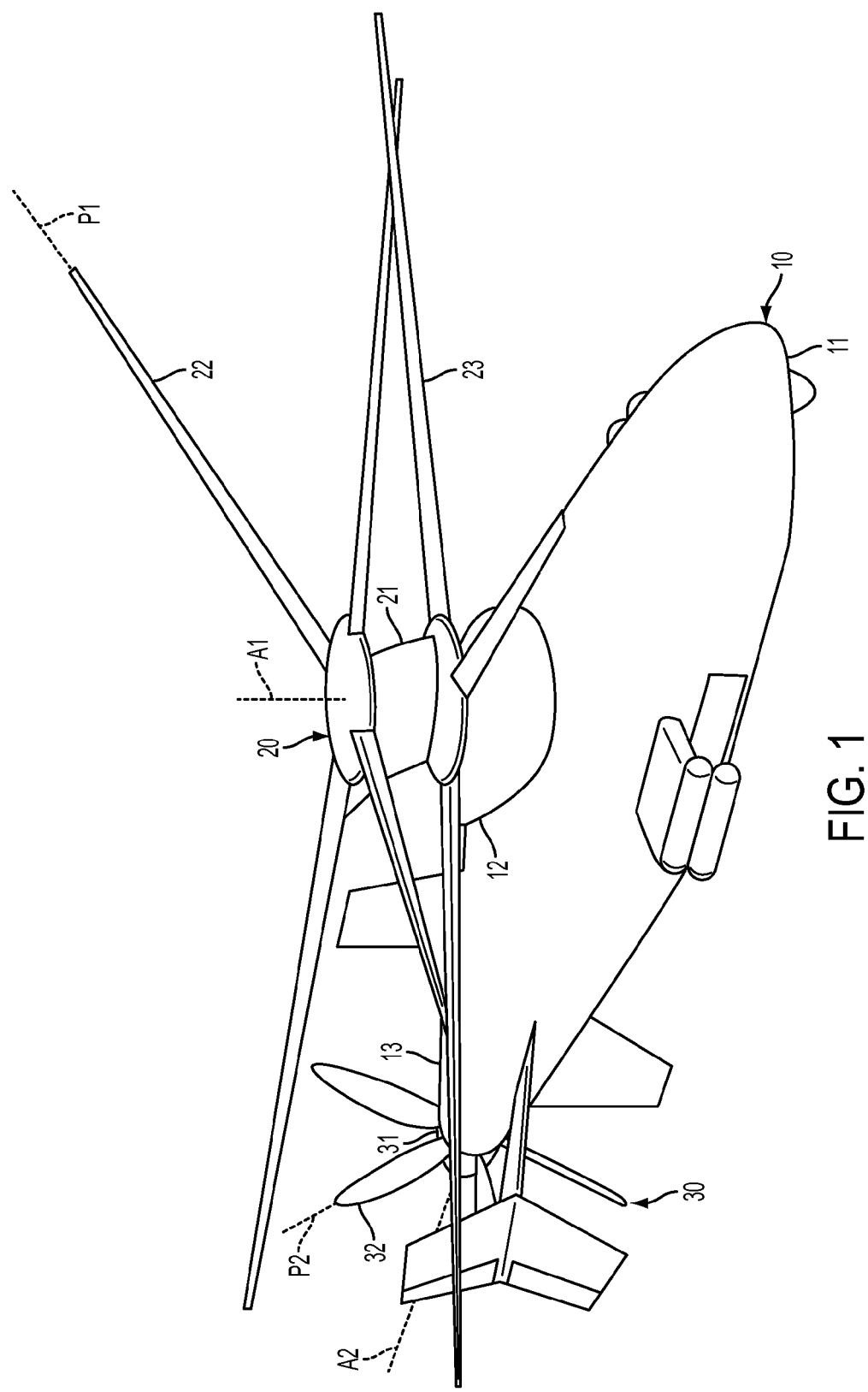
FIG. 1 is a perspective view of an aircraft in accordance with embodiments.
Figure 2:
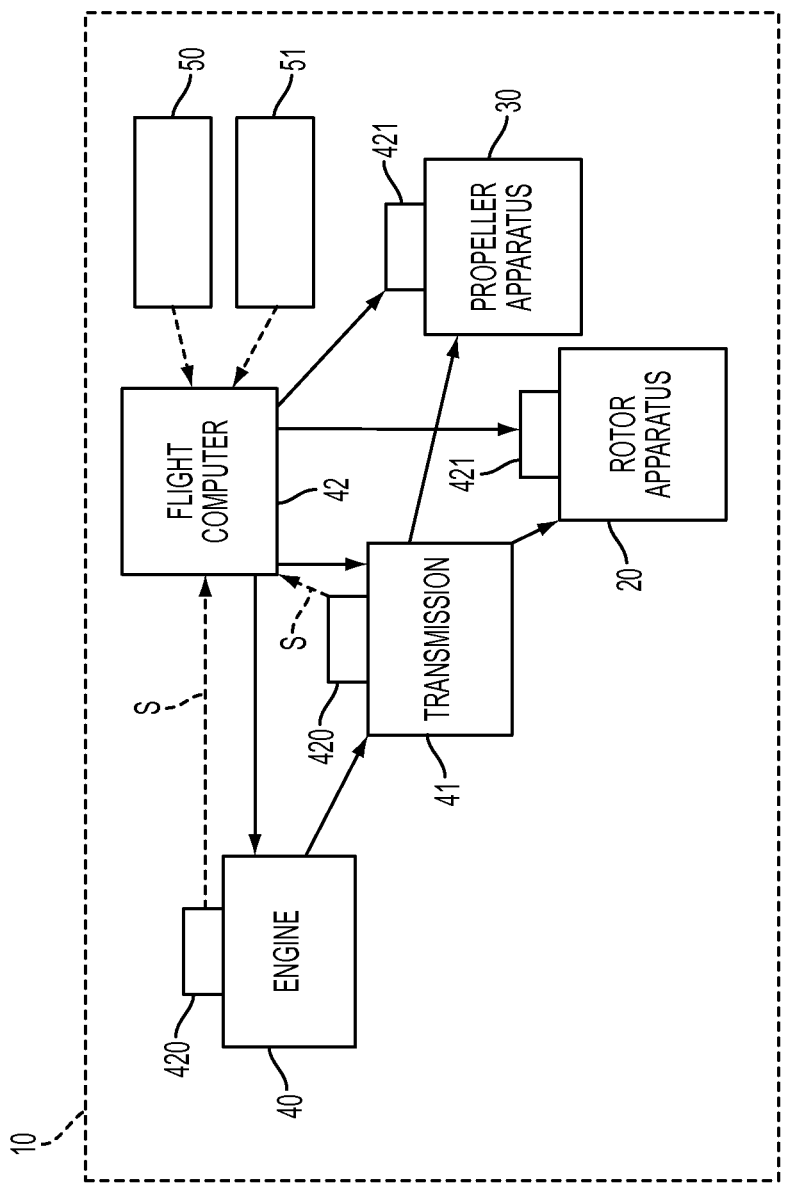
FIG. 2 is a schematic diagram of aircraft systems in accordance with embodiments.

With reference to FIGS. 1 and 2, an aircraft 10 is provided and may be, for example, a helicopter. More particularly and, as shown in FIG. 1, the aircraft 10 may be configured as a coaxial helicopter with a propeller although it is to be understood that this is merely exemplary and that the following description would be applicable to other types of aircraft as well.

The aircraft 10 includes an airframe 11 that may be, but is not required to be, formed to define a cabin, a top portion 12 and, in some but not all cases, a tail portion 13. The top portion 12 is supportive of a main rotor apparatus 20 and the tail portion 13 is supportive of a propeller apparatus 30. The main rotor apparatus 20 includes a hub 21 defining a rotational axis A1 and sets of coaxial, counter-rotating main rotor blades 22 and 23 that each extend outwardly from the hub 21 and are rotatable about the rotational axis A1 to provide for certain flight controls of the aircraft 10. Each of the main rotor blades 22 and 23 is able to pitch about a pitch axis P1 to provide for additional flight controls of the aircraft 10. The propeller apparatus includes a hub 31 defining a rotational axis A2 and a propeller 32, which is rotatable about the rotational axis A2 to provide for certain flight controls of the aircraft 10. Each blade of the propeller 32 is able to pitch about a pitch axis P2 to provide for additional flight controls of the aircraft.

The aircraft 10 further includes an engine 40 and a transmission system 41, which are disposed within the airframe 11, as well as a flight control computer 42. The engine 40 provides motive power to drive rotation of the main rotor and propeller apparatuses 20 and 30 and the transmission system 41 transmits the motive power from the engine 40 to the main rotor and propeller apparatuses 20 and 30. The flight control computer 42 senses operations of the engine 40 and the transmission 41 via communications with sensors 420, which are operably disposed on the engine 40 and the transmission 41 and which are configured to issues signals S to the flight control computer 41 in accordance with sensed conditions of the operations of the engine 40 and the transmission 41. The flight control computer 42 is provided with a computer-readable medium having instructions stored thereon, which, when executed, allow the flight control computer 42 to receive the signals S and to issue control commands to the engine 40 and the transmission 41. The flight control computer 42 is thus able to control operations of the engine 40 and the transmission system 41.

The flight control computer 42 is further configured to control the pitching of each of the main rotor blades 22 and 23 about the pitch axes P1 as well as the pitching of the blades of the propeller 32 about the pitch axes P2 via additional control commands being issued to servos 421, which are operably coupled to the main rotor apparatus 20 and the propeller apparatus 30. More particularly, the servos 421 may be coupled to the blades of the propeller 32 such that the servos can drive the pitching of the blades of the propeller 32 about the pitch axes P2.

In aircraft, such as the aircraft 10, a high percentage of the total motive power generated by the engine 40 is transmitted to the propeller 32 such that the aircraft 10 can be driven at a relatively high airspeed. The pitch of the blades of the propeller 32 is normally set at a relatively high angle in this condition and this translates into a correspondingly high torque demand for the propeller.

In the event of an engine 40 failure, main rotor helicopters, which fly with high main rotor torque and collective pitch at high speeds, tend to quickly lower the main rotor collective pitch in order to maintain/maximize the rotor rotational speed (kinetic energy and angular momentum) so they can continue to control the vehicle during a safe descent to the ground. As the aircraft approaches the ground, the rotational kinetic energy is used to slow the decent by a pulling of the collective pitch, which has to be timed well because once the rotor energy is lost, the aircraft can no longer hold itself in the air.

For aircraft such as the aircraft 10, however, during high speed flight the collective pitch of each of the main rotor blades 22 and 23 tends to be relatively low, but the pitch of the blades of the propeller 32 is high as noted above. The high pitch of the blades of the propeller 32 can quickly consume all of the rotational kinetic energy and cause the rotational speed of the main rotor apparatus 20 to slow down excessively fast. This situation is commonly referred to as "droop" and, in typical cases, it is very difficult for the pilot to reduce the pitch of the blades of the propeller 32 quickly enough to prevent it if the engine 40 fails.

Thus, in accordance with embodiments, the pitch of the blades of the propeller 32 is automatically reduced at the maximum allowable rate in an event of an engine 40 failure. More particularly, the sensors 420 may be configured to sense when an engine 40 failure occurs and, with the flight control computer 42 being operably coupled to the sensors 420, the sensors 420 can issue the signals S to the flight computer 42 as an alert to the flight computer 42 of the engine 40 failure. Upon receipt of such signals S, the flight control computer 42 automatically reduces the pitch of the blades of the propeller 32. The reducing continues to pre-defined safe levels of pitch angles, which may be determined in accordance with flight conditions, such as air speed and wind conditions. In addition, the reducing may be executed as safely as the corresponding servos 421 allow (i.e., at the propeller mechanical rate limit) and as quickly as possible so as to minimize droop and thereby maintain as much rotational kinetic energy as possible.

Figure 3:
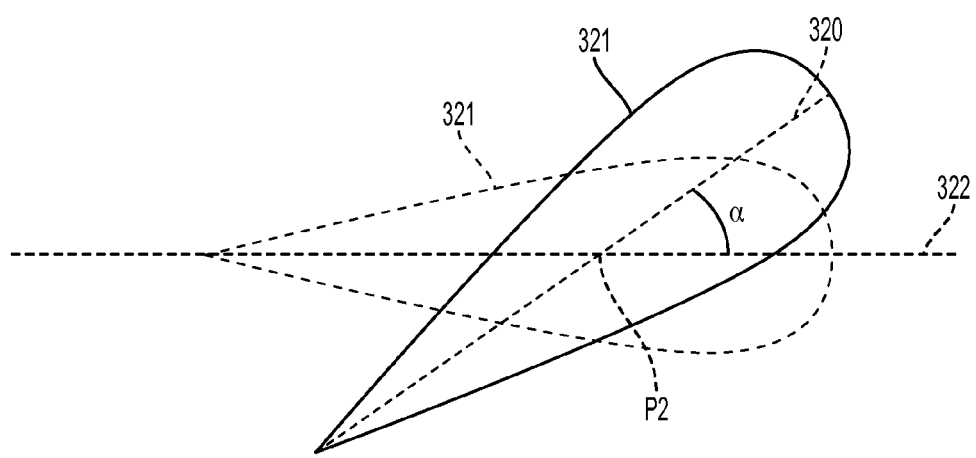
FIG. 3 is a schematic diagram of an angle of attack of a propeller blade before and after a reduction operation.

With reference to FIG. 3, the reducing of the pitch of the blades of the propeller 32 refers to the automatic pitching of the blades about their respective pitch axes P2 so that the angle of attack of each of the blades is reduced. This angle of attack is illustrated in FIG. 3 as angle $\alpha$, which is defined about axis P2 by the chord line 320 of each individual blade 321 and a disk plane 322 of the propeller 32. The angle $\alpha$ may begin at a given magnitude associated with current flight conditions and become reduced as explained herein to the pre-defined safe levels. In so doing, the amount of kinetic energy driving the propeller 32 will be conserved to the extent possible.

In accordance with embodiments, the pilot of the aircraft 10 may have the capability of overriding the automatic reduction. For example, the collective stick may include an override inceptor 50 that, when depressed, halts the automatic reduction and captures the current pitch of the blades of the propeller 32. Also, if the engine 40 tends to transition on and off rapidly and repeatedly, the systems described herein (i.e., the flight control computer 42) can include hysteresis and delay-on logic, which takes a conservative approach in protecting the rotor energy until the engine 40 is known to be once again fully in operation.

In accordance with embodiments, the pilot of the aircraft 10 may have the capability of overriding the automatic reduction. For example, the collective stick may include a propeller beeper 51 that, when depressed, halts the automatic reduction and captures the current pitch of the blades of the propeller 32. Also, if the engine 40 tends to transition on and off rapidly and repeatedly, the systems described herein (i.e., the flight control computer 42) can include hysteresis and delay-on logic, which takes a conservative approach in protecting the rotor energy until the engine 40 is known to be once again fully in operation.

Figure 4:
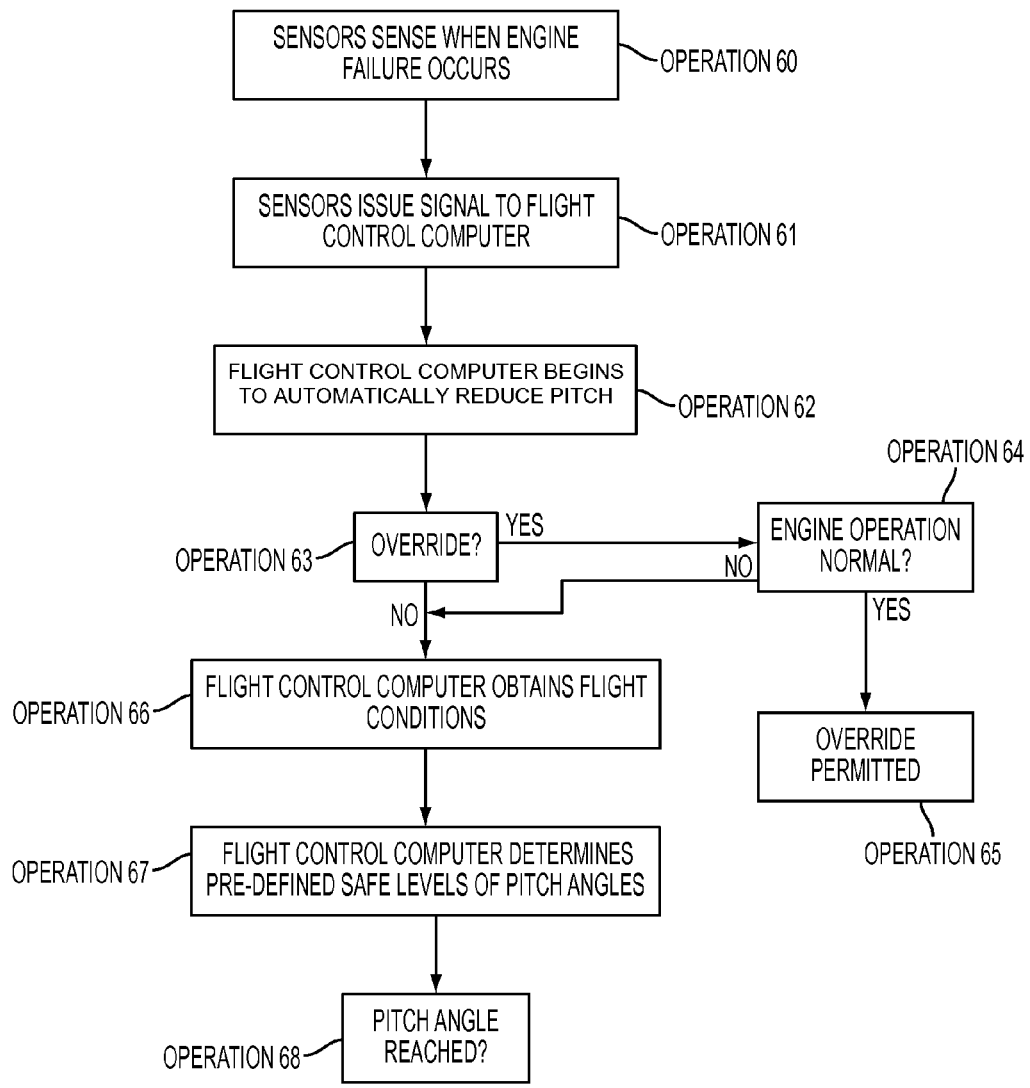
FIG. 4 is a flow diagram illustrating a method of operating the aircraft systems of FIG. 2.

With reference to FIG. 4, a method of operating the flight control computer 42 and the systems of FIGS. 2 and 3 is provided. As shown in FIG. 4, the sensors 420 to sense when an engine 40 failure occurs (operation 60) and issue the signals S to the flight computer 42 as an alert to the flight computer 42 of the engine 40 failure (operation 61). Upon receipt of such signals S, the flight control computer 42 begins automatically reducing the pitch of the blades of the propeller 32 (operation 62) and determines whether the pilot has overridden the automatic reducing (operation 63). If no override is found, the automatic reducing continues. However, in an event the pilot has overridden the automatic reduction, the flight control computer 42 verifies that the engine 40 has returned to normal operation (operation 64) and permits the override in an event that the engine 40 has verifiably returned to normal operation (operation 65). Otherwise, the automatic reducing continues despite the pilot's attempted override.

Subsequently, the flight control computer 42 obtains flight conditions (operation 66) and determines the pre-defined safe levels of pitch angles of the blades of the propeller 32 (operation 67). The reducing then continues to the pre-defined safe levels of the pitch angles (operation 68) as safely as the corresponding servos 421 allow (i.e., at the propeller mechanical rate limit) and as quickly as possible so as to minimize droop and thereby maintain as much rotational kinetic energy as possible.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft, comprising:
   one or more main rotors;
   one or more propellers comprising blades that are rotatable about a rotational axis, a pitch of each of the blades being controllable;
   a flight control computer disposed to control the pitch of each of the blades to reduce propeller blade pitch angles to a pre-defined safe pitch level in an event of an engine failure; and
   an override actuator, which, when activated, overrides a reduction of the propeller blade pitch angles by the flight control computer before reaching the pre-defined safe level.

2. The aircraft according to claim 1, further comprising sensors disposed to determine whether the engine failure occurs and to issue signals to the flight control computer as an alert that the engine failure occurs.

3. The aircraft according to claim 1, further comprising servos disposed to drive a pitching of the blades, wherein the flight control computer is disposed to reduce the propeller blade pitch angles at mechanical rate limits of the servos.

4. The aircraft according to claim 1, wherein the flight control computer is disposed to reduce the propeller blade pitch angles to the pre-defined safe level based on flight conditions.

5. The aircraft according to claim 1, wherein the flight control computer is configured to ignore a command issued via the override actuator.

6. An aircraft, comprising:
   a main rotor apparatus;
   a propeller apparatus comprising blades that are rotatable about a rotational axis;
   an engine to drive operations of the main rotor and propeller apparatuses;
   a flight control computer disposed to reduce a pitch angle of the blades to a pre-defined safe pitch level in an event of an engine failure; and
   an override actuator, which, when activated, overrides a reduction of the propeller blade pitch angles by the flight control computer before reaching the pre-defined safe level.

7. The aircraft according to claim 6, further comprising sensors disposed to determine whether the engine failure occurs and to issue signals to the flight control computer as an alert that the engine failure occurs.

8. The aircraft according to claim 6, further comprising servos disposed to drive a pitching of the blades, wherein the flight control computer is disposed to reduce the pitch angle of the blades at the propeller mechanical rate limit of the servos.

9. The aircraft according to claim 6, wherein the flight control computer is disposed to reduce the pitch angle of the blades of the propeller to the pre-defined safe level based on flight conditions.

10. The aircraft according to claim 6, wherein the flight control computer is configured to ignore a command issued via the override actuator.

11. A method of operating an aircraft, the method comprising:
    automatically reducing a pitch angle of blades of a propeller;
    determining a pre-defined safe level for the pitch angle based on flight conditions;
    continuing the reduction of the pitch angle until the pitch angle reaches the pre-defined safe level; and
    overriding the automatic reduction of the pitch angle before reaching the pre-defined safe level in accordance with pilot commands.

12. The method according to claim 11, further comprising ignoring the override in an engine of the aircraft is not operating normally.

* * * * *